Figure 4:
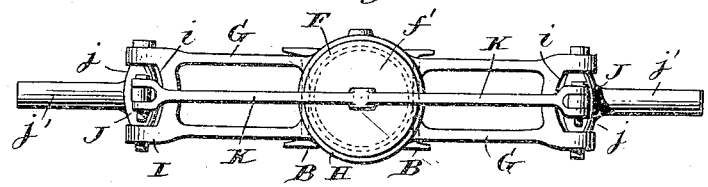

C. H. VAN NOSTRAND.
AXLE BEARING.
APPLICATION FILED DEC. 9, 1912.
1,125,775.  Patented Jan. 19, 1915.
2 SHEETS—SHEET 1.
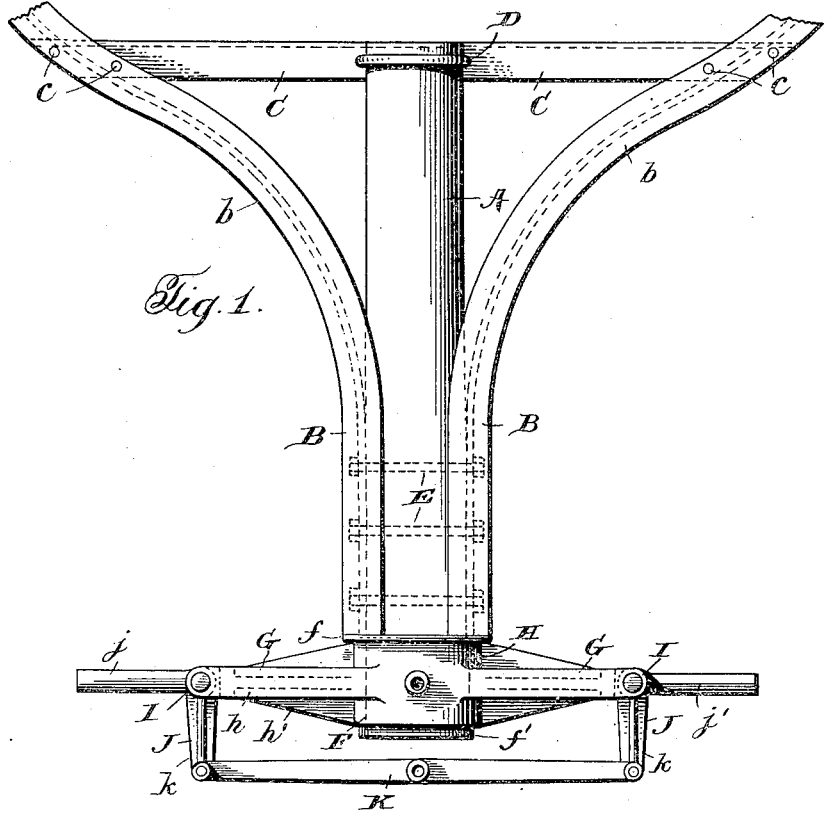
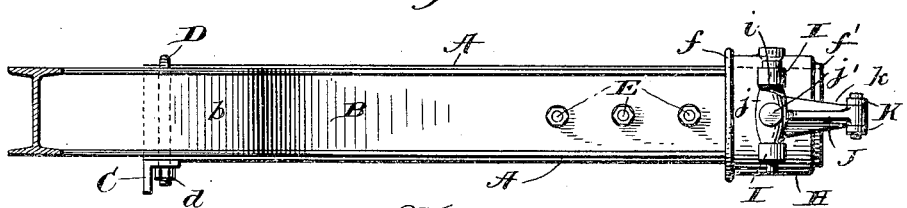
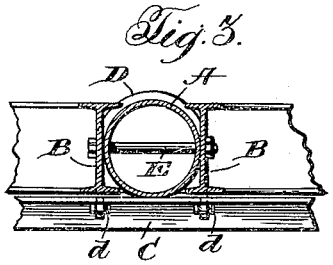
Witnesses:
Jas. Es Hutchinson
Gertrude Wedemeier
Inventor
Charles H. Van Nostrand,
By Brown & Milans, Attorneys

C. H. VAN NOSTRAND.
AXLE BEARING.
APPLICATION FILED DEC. 9, 1912.

1,125,775.

Patented Jan. 19, 1915.
2 SHEETS—SHEET 2.

Witnesses:
Jas. E. Hutchinson
Gertrude Nedemier

Inventor
Charles H. Van Nostrand,
By Bacon & Milan Attorneys

UNITED STATES PATENT OFFICE.

CHARLES H. VAN NOSTRAND, OF OMAHA, NEBRASKA.

AXLE-BEARING.

1,125,775. Specification of Letters Patent. Patented Jan. 19, 1915.

Application filed December 9, 1912. Serial No. 735,732.

*To all whom it may concern:*

Be it known that I, CHARLES H. VAN NOSTRAND, a citizen of the United States, residing at Omaha, in the county of Douglas and State of Nebraska, have invented certain new and useful Improvements in Axle-Bearings, of which the following is a specification, reference being had therein to the accompanying drawing.

This invention relates to improvements in rotary plows of the type disclosed in the Charles H. Van Nostrand Patent No. 955,297, issued April 19, 1910.

In a plow of the character designated, a large cylinder or drum is provided with a plurality of teeth, means being afforded to rotate said drum with its teeth so that the same constitutes a combined tractor and plow, the drum rolling along over and the teeth penetrating and elevating the ground. A framework is supported on the combined tractor and plow, to in turn support the engine or other propelling instrumentalities, and associated parts, the forward portion of said framework being provided with steering wheels for guiding the plow in its travel and operation.

My present improvements are primarily embraced in the means for connecting and mounting the steering wheels on the framework.

The characteristics of the improvements reside in the provision of a central longitudinally disposed frame member, and side members converging to said central member at its forward end, these members together, or in part constituting a support for an axle, adapted to carry the steering wheels. It is desirable that the entire structure be strong, and substantially rigid, that is without undue vibration, so I dispense with all springs, and directly mount the axle on the framework, the immediate connection therebetween being of a pivotal nature to enable the steering wheels to automatically adjust themselves vertically in keeping with the elevations and depressions of the surface over which the machine travels so. that the frame and remaining portions of the machine may be maintained in a substantially true horizontal position, the steering wheels being adapted to turn laterally to properly guide the machine irrespective of their relative positions, vertically, on the ground.

I have conceived several embodiments of the invention above outlined, and others will be apparent to persons skilled in this art, and for the purpose of imparting a full understanding of the invention I will herein illustrate two constructions constituting the preferred embodiments of the invention, and the details in the construction and arrangement of the parts of the same will be apparent from the specific description hereinafter contained when read in connection with the accompanying drawings forming part hereof.

Figure 5:
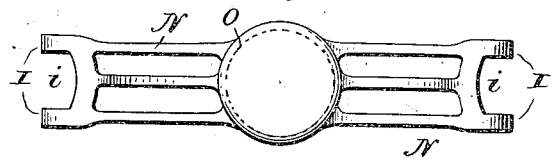
Figure 6:
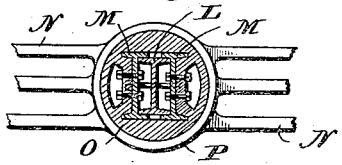
Figure 7:
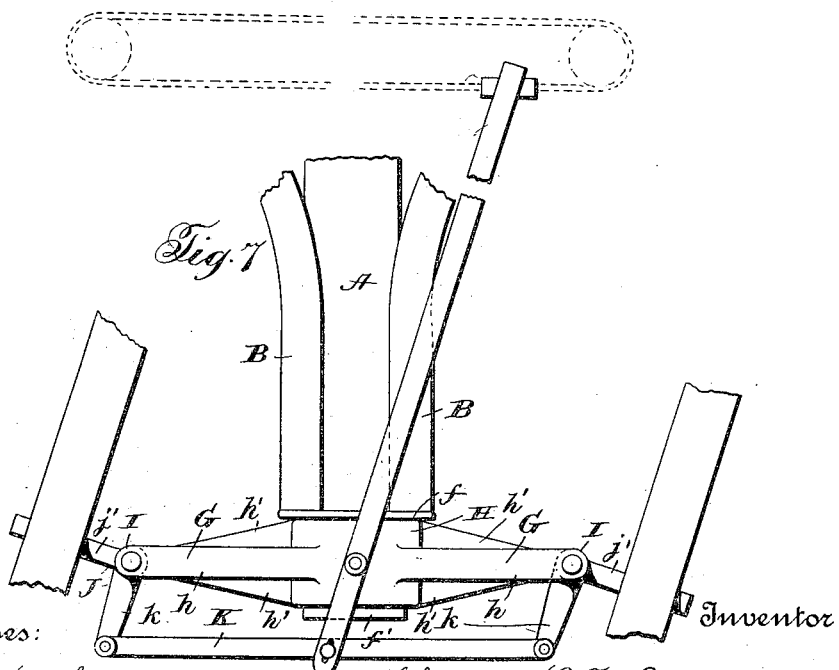

In the drawings, Figure 1 is a plan view of a fragmentary portion of the framework adapted to be mounted on a combined tractor and plow, not necessary to be herein illustrated, and the pivoted axle carried by said frame work. Fig. 2 is a side elevation of the same. Fig. 3 is a cross sectional view of Fig. 1. Fig. 4 is a front view. Fig. 5 is a front view of a modified structure. Fig. 6 is a transverse sectional view through the pivotal mounting of the axle, Fig. 5. Fig. 7 is a diagrammatic view.

Referring more specifically to the drawings, wherein like reference characters designate corresponding parts in the several views, A represents a central longitudinally disposed cylindrical frame member, secured at its inner end to a transversely arranged angle bar C by means of a U-bolt D passing around the cylindrical member A and through one of the flanges of the bar C, nuts $d$ securing the parts together. The outer end of the cylindrical member is mounted as will presently appear.

B are parallel side angle bars of the frame converging inwardly toward each other at their forward ends, as at $b$, the same being riveted to the ends of the bar C as at $c$, the forward terminals or the converging portions of the side bars being substantially parallel (see Fig. 1), spaced so as to receive between the flanges thereof the cylindrical frame member A (Fig. 3) the three frame members being fastened together by transverse bolts and nuts E. The forward end of the cylindrical member A extends forwardly beyond the terminals of the side members B a sufficient distance to constitute a trunnion F adapted to receive between a washer $f$ and cap $f'$ thereon the axle G adapted to support the forward or steering wheels, said axle being provided with an enlarged central bearing H bored to slip over and rock in a vertical direction upon the trunnion constituted by the end of the frame member A. The axle G is formed of metal,—so are the various frame members,—and is provided with suitable reinforcing flanges $h$, $h'$, the latter tapering outwardly from the tubular or bearing portion H of the axle to the ends of the same, while the flanges $h$ are preferably of uniform width throughout.

The opposite ends of the axle are recessed as at $i$ and provided with vertically alined perforated ears I through which are adapted to pass pivot bolts engaging and similarly passing through the intermediate pivot bearing $j$ of steering knuckles J each having a stub pintle $j'$ to rotatively support a wheel and an arm $k$ angularly related to the stub pintle pivotally connected to the end of a cross rod or link K to insure the turning of the steering knuckles in unison. Any convenient or preferred means may be employed to effect the turning of the steering knuckles and correspondingly turn the wheels to guide the machine.

From the foregoing construction, it will be appreciated that a strong rigid arrangement is provided, enabling the maintenance of the major portions or body of the machine in a horizontal plane, while permitting the steering wheels to rise and fall in keeping with irregularities of ground surface on the trunnion F, at the same time enabling the turning of the steering knuckles and the wheels carried thereby, at the will of the operator, independently of the vertical adjustment of the wheels, to properly guide the machine.

The nesting or clustering of the forward ends of the various frame members at the point of pivotal mounting of the axle furnishes at this point the reinforcement and strength required to resist the strains exerted by reason of the manipulation and rocking of the steering wheels, which latter, of course, in turn through the frame, support, in conjunction with the combined tractor and plow the various operating parts and attachments which have to be mounted on or carried by the framework.

In the foregoing description, I have referred especially to that form of my device illustrated in the first series of views of the drawing and I will now consider the second form disclosed in Figs. 5 and 6. The structures are in the main the same. In the present instance, however, as distinguished from having the cylindrical central member A, I provide a central member of I-formation, indicated at L, similar to the I-formation of the side members of the frame, here indicated at M; also, instead of utilizing a portion of a tubular central member A as a trunnion on which the axle N may rock in a vertical direction, I form a cluster of the terminal portions of the three frame members and pass them through and fasten them to a bearing sleeve O, thus providing a composite trunnion, so to speak, over which the central bearing portion P of the axle may fit and rock the same as in the example first described. This arrangement furnishes a trunnion of maximum strength for use in extra heavy machines, or machines subjected to abnormally rough usage and corresponding strains.

I claim:

1. In combination with a frame of the character described having a centrally disposed longitudinal member and side members converging forwardly to parallel end portions clustered with the adjacent end of the central member, one of said members projecting forwardly to constitute, in part, a trunnion, means engaging the parallel portions of the clustered members for securing them together, and an axle pivotally mounted upon the trunnion, substantially as described.

2. In combination with a frame of the character described having a centrally disposed longitudinal member and side members converging at their forward ends to be clustered with the adjacent end of the central member, one of said members projecting forwardly to constitute, in part, a trunnion, means for securing the clustered members together, and an axle pivotally mounted upon the trunnion, the central member being of cylindrical formation, and the side members being flanged to receive between the flanges thereof said cylindrical central member.

3. In combination with a frame of the character described having a centrally disposed longitudinal member and side members converging at their forward ends to be clustered with the adjacent end of the central member, one of said members projecting forwardly to constitute, in part, a trunnion, means for securing the clustered members together, and an axle pivotally mounted upon the trunnion, and a transverse connecting bar between the side members secured to the inner portion of the central member, substantially as described.

4. A frame of the character described, comprising a series of frame members, a fixed trunnion member therebetween, said frame members having end portions clustered and fixedly secured together and to the trunnion member, to constitute a reinforced trunnion, in combination with an axle mounted to rock upon said trunnion, substantially as described.

5. A frame of the character described arranged in a substantially horizontal plane provided with a centrally disposed trunnion extending longitudinally of the frame, in combination with an axle having a bearing portion mounted on the trunnion enabling the axle to rock in a vertical direction relative to the frame, said axle having reinforcing top and bottom flanges, and bracing flanges on the web intermediate of said top and bottom flanges tapering outwardly from the opposite sides of the axle bearing to the end portions of the axle, substantially as described.

6. In combination with a frame of the character described having a centrally disposed longitudinal member and side members converging at their forward ends to be clustered with the adjacent end of the central member, one of said members projecting forwardly to constitute in part a trunnion, means for securing the clustered members together, and means engaging the inner end of the central member and anchoring the same, whereby the opposite ends of said central member are securely fastened relative to the frame, substantially as described.

7. In combination with an axle, a frame of the character described having opposite side members and inwardly projecting forward members, a cross member between said side members spaced from said forward members and located rearwardly of the latter, and a fixed support for the axle and relative to which the axle is adapted to rotate associated with the frame at the front thereof comprising the forward ends of three members fastened together at a point adjacent to said axle, the outside members being connected to the frame side members and the intermediate member extending rearwardly to said frame cross member.

In testimony whereof I affix my signature in presence of two witnesses.

CHARLES H. VAN NOSTRAND.

Witnesses:
H. S. DANIEL,
E. S. PARSONS.

Copies of this patent may be obtained for five cents each, by addressing the "Commissioner of Patents, Washington, D. C."